Figure 1:
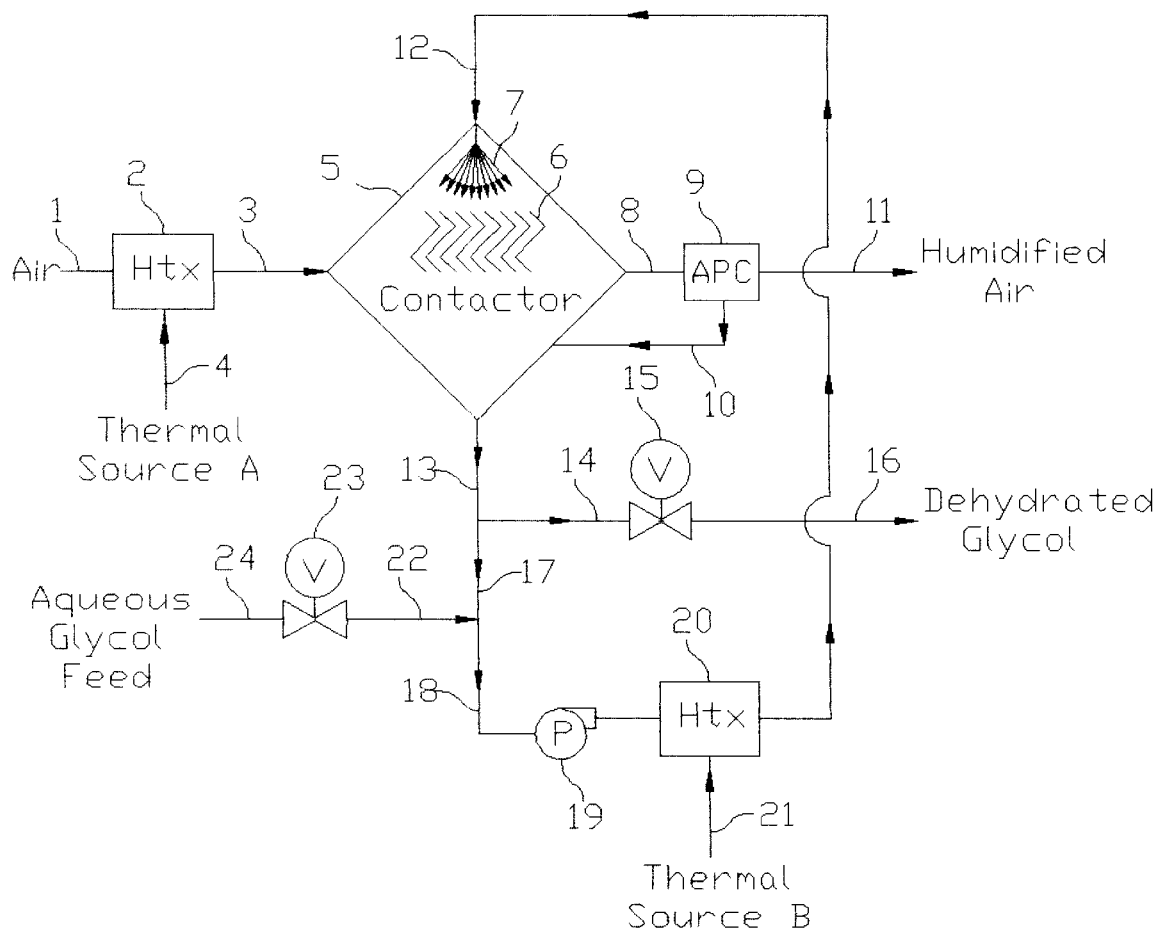

United States Patent

Harris et al.

[11] Patent Number: 5,958,110
[45] Date of Patent: Sep. 28, 1999

[54] EVAPORATIVE PROCESS FOR THE REGENERATION OF AQUEOUS GLYCOL SOLUTIONS

[76] Inventors: James Jeffrey Harris, 2592 Westridge Dr., Cameron Park, Calif. 95682; James William Harris, 14080 Berry Rd., Golden, Colo. 80401

[21] Appl. No.: 08/999,316

[22] Filed: Dec. 29, 1997

[51] Int. Cl.⁶ .................................................. B01D 47/00
[52] U.S. Cl. ............................... 95/166; 95/169; 95/170; 95/186; 95/191; 95/207
[58] Field of Search .......................... 96/202, 234, 242; 95/245, 263, 265, 170, 188, 191, 206, 207, 161, 163, 159, 165, 166, 169, 178, 179, 186

[56] References Cited

U.S. PATENT DOCUMENTS

| | | | |
|---|---|---|---|
| 2,428,643 | 10/1947 | Young | 183/120 |
| 3,105,748 | 10/1963 | Stahl | 55/32 |
| 3,321,890 | 5/1967 | Barnhart | 55/32 |
| 3,349,544 | 10/1967 | Arnold | 55/32 |
| 3,370,636 | 2/1968 | Francis | 159/16 |
| 3,450,603 | 6/1969 | Meyers | 203/18 |
| 3,594,985 | 7/1971 | Ameen et al. | 95/163 |
| 3,844,736 | 10/1974 | Kruis et al. | 95/207 |
| 3,867,112 | 2/1975 | Honerkamp | 55/32 |
| 3,877,893 | 4/1975 | Sweny et al. | 95/207 |
| 4,010,009 | 3/1977 | Moyer | 55/32 |
| 4,182,659 | 1/1980 | Anwer | 203/18 |
| 4,273,620 | 6/1981 | Knobel | 203/18 |
| 4,280,867 | 7/1981 | Hodgson | 159/47 R |
| 4,314,891 | 2/1982 | Knobel | 203/18 |
| 4,434,034 | 2/1984 | Padilla | 202/153 |
| 4,460,383 | 7/1984 | Valerius | 55/32 |
| 4,701,188 | 10/1987 | Mims | 55/20 |
| 4,769,048 | 9/1988 | Becker et al. | 95/263 |
| 5,129,925 | 7/1992 | Marsala et al. | 96/242 |
| 5,167,675 | 12/1992 | Rhodes | 55/32 |
| 5,490,873 | 2/1996 | Behrens et al. | 95/179 |
| 5,535,877 | 7/1996 | Eastcott et al. | 203/18 |
| 5,536,303 | 7/1996 | Ebeling | 95/166 |

*Primary Examiner*—Duane S. Smith
*Attorney, Agent, or Firm*—Edwin H. Crabtree; Donald W. Mavgolis; Ramon L. Pizarro

[57] ABSTRACT

A low temperature process for the dehydration of aqueous glycol solutions using an induced airflow (3) and low temperature thermal sources (4, 21) to reduce the water concentration in aqueous glycol solutions (22). The invention utilizes the ability for air to evaporate water at low vapor pressures and corresponding low vapor temperatures in a direct contacting device (5). The relative vapor pressures of glycol to water at low temperatures assures the preferential vaporization rate of water over that of glycol thereby providing dehydration and effective regeneration of aqueous glycol solutions.

21 Claims, 1 Drawing Sheet

EVAPORATIVE PROCESS FOR THE REGENERATION OF AQUEOUS GLYCOL SOLUTIONS

BACKGROUND

1. Field of Invention

This invention relates to an evaporative process for the regeneration of aqueous glycol solutions.

2. Description of Prior Art

Aqueous solutions of glycol have been used commercially and by industry for years. Glycol solutions have been used for various purposes. Two significant uses of glycol are as an antifreeze agent and as a liquid desiccant for the dehydration of gases.

In antifreeze applications, glycols are used in both open and closed systems. A typical open system use would be as a sparged de-icing fluid for external aircraft surfaces. A typical closed system use would be as a heat transfer fluid in heating or cooling loops.

Dilution or contamination of glycol by water or other materials usually reduces their performance. Reestablishment of performance requires either replacement of the glycol or treatment for the removal of the diluent water and/or other contaminants.

In open antifreeze applications, glycols are typically diluted with water originating as rain, snow, ice and sometimes seawater. In the de-icing of aircraft, dilution of the glycol is expected since the intent is to melt ice and snow from aircraft external surfaces. The drainage fluids from the aircraft during and after de-icing are diluted and contaminated glycols. These fluids are then either discarded or processed (for removal or reduction of the diluent water and other contaminants) for reuse.

Another antifreeze application of industry is in the use of glycols as pipeline additives to prevent hydrate formation. This practice is particularly common in the petroleum industry. Natural gas while in the presence of water can form solid or semi-solid hydrate barriers in pipelines and process equipment at relatively high temperatures. Glycols are injected into the pipelines to provide protection against the formation of hydrates. The difficulty imposed by this application of glycols is the treatment or disposal of the glycol laden fluids remaining after such use. Glycols are added to pipelines and process equipment only in the presence of liquid or vaporous water. This situation occurs in gathering systems, transmission lines, and equipment prior to gas treatment. Gas treatment typically includes dehydration which eliminates the potential for hydrate formation. The pipelines and equipment upstream of treatment generally are located between the production wells and the treatment facilities. In these locations a liquid commonly present with the gas is production brine. These brines contain dissolved and suspended solids. The solids impede regeneration processes because of the scaling and fouling tendencies inherent in conventional boiling regeneration for the dehydration of the injected glycols. Often, because of these difficulties, such glycol laden fluids are simply discarded, with no attempt given toward regeneration and reuse of the glycols.

Typical closed system antifreeze applications use glycols as heat transfer fluids. Contamination of these fluids does not typically result from dilution by water. Contamination generally results from suspended particulate, pipe scale, products of oxidation or reduction, water born precipitates, etc. Such contaminated glycols generally are either discarded or processed (for removal or reduction of the diluent water and other contaminants) for reuse.

Most of the glycols are relatively toxic materials not acceptable for disposal to the environment. In rare cases contaminated glycols are thermally destroyed. Generally glycols are recycled for use through various process steps such as filtration, pH neutralization, thermal regeneration and/or electrodialysis treatment. Dehydration agent glycols often only require thermal regeneration, though other process steps, such as those described in the previous sentence are commonly used.

Industrial uses of glycols as dehydration agents are widespread. For many industries glycol dehydration is the process of choice. This is particularly true for the dehydration of natural and other industrial gases. In these applications, a glycol solution is brought into direct contact with the humid or wet gas. Generally this is accomplished through direct contact equipment such as contacting towers or chambers. The glycol solution absorbs water from the wet gas through the contacting process. The resulting gas becomes dehydrated and the aqueous concentration of the glycol solution increases. The dehydration capability of the glycol decreases as the aqueous content of the glycol solution increases. In process, the high aqueous content glycol, referred to as rich glycol, is then itself dehydrated, referred to as regenerated, by the application of high temperature heat. The regenerated glycol, referred to as lean glycol, once again has an affinity for water and is reused in process.

Thermal regeneration plays a dominant role in the utilization of glycol in industry. In the regenerative process, the aqueous phase of the glycol solution is boiled off in a device typically referred to as a "reboiler." Depending upon the level of dehydration required, glycols are sometimes further dehydrated, after treatment in a reboiler, with a dried and usually heated stripping gas. This stripping gas is used to regenerate glycols to very low water content levels.

The presence of glycol in an aqueous solution elevates the boiling temperature of the solution. Higher glycol concentrations require higher temperatures for boiling. Temperatures of between 250° F. and 350° F. are common operating conditions for most reboilers. To dehydrate glycols in a reboiler to the level available through the stripping process would require temperatures in excess of the thermal degradation temperature of the glycols. Final polishing, when needed, is therefore provided by the stripping process. After the stripping process the hydrated stripping gas is usually wasted or used as fuel gas for the reboiler or other process fuel requirements. Stripping is primarily a glycol polishing process to remove the small amount of water remaining after the reboiler. The majority of regeneration occurs in the thermal energy absorbing reboiler.

The thermal regenerative process for the dehydration of aqueous glycol solutions has a long history of use, though the process suffers from several disadvantages:

(a) Because of the relatively high temperature requirements, high quality energy is needed. Typically fuel oils, natural gas, coal/coke or electrical energy is utilized for operation of the reboilers. The operating costs to fuel the reboilers generally are quite high. Also the combustion byproducts from the reboilers generally contain environmentally sensitive components for which air pollution permitting and possibly emission offsetting are required. Numerous process refinements have been developed to reduce the energy requirements. Some of these refinements use methods for recapturing and reusing the energy used for the regeneration. These methods reduce the thermal energy requirements but do not reduce the temperature requirements of the thermal energy that is used. Other methods reduce the energy requirements and to a limited extent the high temperature requirements by utilizing a portion of the dehydrated gas for stripping of the glycol solution. These methods then use the rehydrated gas for combustion as a fuel gas for the reboiler component of the process. Even with the refinements, thermal regeneration of aqueous glycols require the utilization of substantial amounts of high grade thermal energy. This is disadvantageous from economic, operational and environmental standpoints.

(b) The high temperature requirements of thermal regeneration forces the use of metallic materials of construction which are expensive, heavy and somewhat difficult to work with. Additionally these materials often must be corrosion resistant: thus necessitating the use of high alloys and exotic, expensive materials of construction.

(c) The vapor pressure of glycols increase with temperature. At the high operating temperatures of the reboilers, a significant loss of glycol occurs. This loss results from the high vapor pressure of glycol in the reboiler and the convected loss of this glycol vapor to the environment. This loss presents both an economic and environmental penalty to the operation of the reboilers. The lost glycol must be replaced at a significant cost. The environmental effects of the glycol emissions may require emission control equipment, an expensive and often operationally unattractive requirement. Other expenses and operational problems related to environmental concerns, are the requirements for additional permitting and/or acquisition of offset emitters.

(d) Glycol vapor emissions which, as described above, are significant at the high operating temperature of reboilers, confer an unpleasant odor to the local environment. This odor, if not hazardous, is certainly a nuisance for which consideration must be given. Placement and operation of the reboilers must consider the negative effects of the odor on operating personnel or other nearby human environs.

(e) The reboilers of the present regenerative processes are susceptible to scale buildup and fouling of heat exchange and other surfaces. These problems result from impurities in the aqueous glycol solutions. These impurities are in the form of suspended particulates and/or dissolved materials. The suspended particulate may come from either the glycol or aqueous phase source or from the materials of construction of the process system. Dissolved materials generally come from the aqueous source of the glycol solution. Dissolved materials may also originate by dissolution of the materials comprising the process system. For example, dissolved iron is a common depositional problem in process systems where carbon steel is used as a material of construction. As the aqueous glycol solutions are heated, there can be a tendency for the contaminants to deposit and foul surfaces in the reboilers and related systems. This phenomenon is especially common at the higher temperatures which exist in reboilers. The temperature sensitivity of the deposition phenomenon generally results in the fouling of the heat exchange surfaces (the hottest surfaces) in the reboilers. Operationally this is the worst location for fouling because of the detrimental effects it has upon heat transfer efficiency. To minimize fouling and scaling problems anti-scalants, dispersents and other chemicals are commonly used in the reboilers. These materials are expensive and quite often hazardous but often are necessary for successful long term operation.

In addition to the temperature dependent scale deposition problems inherent in the high temperature operation of reboilers, there also is a natural tendency for precipitates to form on the reboiler heat transfer surfaces as a result of aqueous phase change. Operation of the reboiler requires flashing of the aqueous phase of the solution to form a vapor. This flashing process occurs on the heat transfer surfaces of the reboiler. As the aqueous phase flashes to vapor, dissolved or suspended solids precipitate from the solution at the point of vaporization. As previously discussed, this is the worst location for fouling because of the detrimental effects it has upon heat transfer efficiency.

A continuous venting, referred to as blowdown, of the solution in the reboilers is also sometimes used in conjunction with the addition, referred to as makeup, of new cleaner fluid as an approach to minimize fouling and scaling tendencies. With this approach the requirement for the addition of new, cleaner fluids is expensive and can be operationally disadvantageous. Another disadvantage of this approach is in the problem of disposal of the blowdown. The cost for the disposal of the blowdown solution and the environmental concerns related to such disposal can be prohibitive.

(f) In order to reduce the scaling, fouling and precipitate formation problems inherent in high temperature reboilers, treatment of the aqueous glycol "upstream" of the reboiler is common. Upstream treatment equipment is typically filtration for particulate removal and occasionally electrodialysis, reverse osmosis or other methods for the removal of dissolved solids. This equipment is both expensive to acquire as well as expensive and difficult to maintain.

(g) Dehydrated glycol from the reboiler is a high temperature fluid which often must be cooled prior to use for dehydration. This is accomplished either through a heat exchanger for thermal reuse in the reboiler or a separate cooling system. The required equipment adds a significant cost to the regeneration system. Also heat exchangers and/or cooling systems are vulnerable to scaling, fouling and operational difficulties.

OBJECTS AND ADVANTAGES

This invention relates to a thermal process whereby an air induced, evaporative process provides regenerative effects to aqueous glycol solutions. The advantages of the invention result primarily from the ability of the invention to regenerate the aqueous glycol solutions at low temperatures.

The low temperature operating capability of the invention as well as other features provides several objects and advantages over the prior art. Some of which are as follows:

(a) Because of the low operating temperature, high grade (high temperature) heat is not required. This is a great advantage in that waste heat can be used as a thermal source. Waste heat is traditionally discarded to the environment as having no economic or operational value. The invention can utilize this wasted thermal energy for the useful purpose of regeneration of aqueous glycol solutions. The use of this thermal energy source eliminates or reduces the cost of fuel for operation of a reboiler. As a consequence the economic and operational benefits can be substantial.

(b) Since waste heat can be utilized in lieu of combustion fuels, environmental emissions of fuel combustion products can be reduced or eliminated. In addition to environmental benefits, this can reduce or eliminate permitting costs, siting constraints, as well as operating difficulties, costs and scheduling.

(c) Since the invention can operate at temperatures within the operational limits of inexpensive plastics, these materials can be used for fabrication of the regeneration equipment. This reduces the cost of the regeneration equipment and makes it lighter, easier to maintain and, as is often a high priority, corrosion resistant.

(d) Glycol vapor pressures are dependent upon temperature. At the lower regeneration temperatures of the invention, the glycol vapor pressures are significantly reduced. As a result the glycol losses during regeneration are minimized. This is a significant economic, operational, environmental, siting and permitting advantage.

(e) The low regeneration temperature of the invention and the resultant lower glycol vapor pressures result in a reduced glycol loss to the environs. The sickly sweet odor of emitted glycol is reduced. The operating and living environs are therefore made more pleasant and healthier for operating or other affected personnel.

(f) The low regeneration temperature of the invention minimizes the tendency for fouling and scaling of heat exchange and other surfaces. The lower operating temperature of the invention reduces the operating difficulties produced by temperature induced scaling and fouling from contaminated aqueous glycol solutions which exhibit temperature sensitivity toward such deposition.

(g) The vaporization process of the aqueous phase occurs physically separate from the heat transfer process. As a result, any precipitates which form will not foul or damage the heat transfer surfaces or process.

(h) The reduced fouling and scaling tendencies at the lower regeneration temperatures minimize the requirements for pretreatment. This advantage results in lower capital and operating costs.

(i) The low temperature regeneration capability minimizes heat transfer requirements for cooling of the regenerated glycol solutions. This reduces capital and operating expenses over that which would be required if high temperature regeneration were utilized.

(j) The ability of the invention to use low temperature, low grade heat provides the opportunity to use waste heat as a thermal source. Typically waste heat is a byproduct of an exothermic process from which heat must be removed to facilitate process continuation.

Cooling equipment, to remove this waste heat, is therefore an integral part of the process system. The invention can provide cooling services concurrent with glycol regeneration. This is advantageous in the reduction or elimination of cooling system capital and operational expenses. For those processes which utilize evaporative cooling, an additional benefit resulting from the use of the invention for cooling, is in the reduction or elimination of liabilities inherent with the blowdown of coolant to the environment.

DRAWING FIGURES

FIG. 1 is a process diagram of the invention.

Reference Numerals in the Drawing

1 Airstream induced through the invention
2 Airstream heat exchanger (Optional if aqueous glycol solution heat exchanger, item #18, is utilized)
3 Contactor airstream (will be heated to above inlet airstream wet bulb temperature if item #2 is in use)
4 Thermal source to item #2 (Thermal source temperature must be higher than the inlet airstream wet bulb temperature)
5 Contactor
6 Contacting surface media (Optional to enhance performance of the distribution system, item #7)
7 Distribution or sparger system
8 Humidified Airflow
9 Air pollution control device (Optional)
10 Air pollution drain back to process (Optional)
11 Humidified air to discharge
12 Aqueous glycol solution into the contactor (Heated to above the contactor airstream wet bulb temperature if heat exchanger #18 is utilized)
13 Dehydrated (lean) glycol solution
14 Bleed or blowdown of lean glycol solution as product or for further dehydration or treatment
15 Lean glycol bleed control valve or mechanism
16 Dehydrated (lean) glycol product or feed for further dehydration or treatment
17 Lean glycol solution remaining after #14 is bled from #13
18 Mixture of lean glycol from the contactor and rich glycol feed
19 Circulation pump
20 Aqueous glycol solution heat exchanger (Optional if item #2 is utilized)
21 Thermal source for heat exchanger item #20 (Temperature must be higher than the contactor airstream wet bulb temperature)
22 Inlet for wet (rich) aqueous glycol solution
23 Inlet valve or mechanism to control the rich glycol feed
24 Rich glycol feed

BRIEF SUMMARY OF THE INVENTION

The intent of this patent is to describe a low temperature process and a mechanism for the dehydration of aqueous glycol solutions. The process incorporates the introduction of an airstream in direct contact with an aqueous glycol solution. The provided airstream conveys the equilibrium water vapor away from the aqueous glycol solution. The conveyance maintains a low water vapor concentration at the air to aqueous glycol solution interface. The low water vapor concentration generates a low water vapor partial pressure which provides the environment for low temperature vaporization. At the reduced vapor pressure, the interfacial water vapor and the aqueous phase of the glycol solution are not in thermodynamic equilibrium. To re-establish the natural requirements for thermodynamic equilibrium, water vaporizes at a low temperature from the aqueous phase and passes through the interface to replace the water vapor removed by the airstream. The vaporization of the water vapor away from the interface and subsequent conveyance by the airstream results in dehydration of the aqueous glycol solution.

The transference of the water from the aqueous phase to the vapor phase requires energy. This energy is supplied as thermal heat from either the liquid phase of the aqueous glycol solution and/or the contacting airstream. To maintain the continued dehydration process, thermal energy must be supplied either to the contacting airstream or to the aqueous glycol solution. The thermal energy temperature requirement is low. For thermal energy supplication into the contacting airstream, the minimum thermal energy source temperature is the sum of the of the airstream dry bulb temperature and the temperature differentials across any utilized heat exchangers. For thermal energy supplication into the aqueous glycol solution, the minimum thermal energy source temperature is the sum of the airstream wet bulb temperature and the temperature differentials across any utilized heat exchangers.

Description-FIG. 1

Direct to obtaining the effect of the invention a typical embodiment is illustrated on FIG. 1 and is described in the following discussion. Air 1 is brought through an optional heat exchanger 2 which, if utilized, transfers thermal energy 4 at a minimum temperature of the sum of the airstream 1 dry bulb temperature and the temperature differential of heat exchanger 2 from an external source A into the airstream 1. The, heated airstream 3 is directed into a contacting chamber 5, referred hereafter as the contactor, where the airstream 3 and an (optionally heated) aqueous glycol solution 12 are brought into direct contact. The direct contact may be brought about by a plurality of means. The aqueous glycol solution 12 may be sparged 7 into the airstream 3 and/or distributed over a contacting media 6 through which the airstream 3 passes. Said contacting media 6 provides increased contact time between the airstream 3 and the glycol solution 12 as well as may provide increased interfacial area for contact. The use of contact media 6 in combination with, or in lieu of a sparger system 7, may expedite thermal and mass transfer rates which will enhance the performance and reduce the overall physical dimensions of the contactor 5 and associated equipment.

As the airstream passes through the contactor, water is transferred as a liquid from the aqueous glycol solution 12 into the airstream 3 as a vapor. The water vapor is then conveyed with the now humidified airstream 8 out and away from the contactor. The effect is to dehydrate the aqueous glycol solution 12. Dependent upon environmental constraints as well as performance characteristics of the contactor 5, sparger 7 and/or contacting media 6, the airstream 8 may be directed through an air pollution control device 9 to remove mist or droplets of aqueous glycol solution entrained within the airstream 8. Fluids collected by the air pollution control device 9 can either be discarded, used for some other purpose or as in this embodiment, returned to the invention for processing 10.

After contacting the airstream, the dehydrated glycol 13 is removed from the contactor. A portion 14 or, under the unique conditions of high thermal source temperatures and/or low dehydration requirements, all of the dehydrated glycol is removed from the process through a bleed control mechanism 15. The bleed is then discharged 16 as product or for further treatment.

The aqueous glycol solution to be dehydrated 24 is fed into the process through the inlet control mechanism 23. The feed volume 22 is controlled to balance the sum of the bleed volume 16 and the liquid equivalent volume of water vaporized from the aqueous glycol solution 12 in the contactor 5 and discharged in the humidified airstream 11. The feed volume 22 is blended with the dehydrated glycol solution 17 remaining after the bleed. The blended solution 18 is pressurized through circulating pump 19. If heat exchanger 20 is utilized, thermal energy 21 at a minimum temperature of the sum of the wet bulb temperature of the airstream and the temperature differential of heat exchanger 20 is transferred into the aqueous glycol solution 18. The aqueous glycol solution (optionally heated) 12 is then introduced to the contactor 5 and the process is repeated.

In the invention the process utilizes thermal energy at low temperatures. As described above the thermal energy may be supplied to the process either through heat transfer 4 into the airstream 1 at heat exchanger 2 and/or through heat transfer 21 into the aqueous glycol solution 18 at heat exchanger 20. The option as to where the thermal energy is supplied is determined by the characteristics and availability of the thermal sources.

Conclusion, Ramifications, and Scope

The reader will see that the invention provides a thermally driven process for the dehydration of aqueous glycol solutions at exceptionally low temperatures. The advantages over prior processes are substantial in that low temperature heat may be used. This permits the use of waste heat. This capability to utilize waste heat provides the invention with the additional opportunity to service other, separate, processes which require cooling. For those situations where waste heat is available but for which cooling services are not required, as in heat entrained in stack or flue gas, the invention permits the use of essentially free heat for the dehydration process. This capability provides a significant economic and environmental advantage over conventional thermal glycol dehydration processes which require the consumption of fuel or electricity. The reader will also see that other advantages are inherent to the unique low operating temperature capability of the invention. Some of these additional advantages are:

The low temperature operating capability of the invention provide advantages in that lightweight, inexpensive and easy to fabricate, high temperature sensitive materials, such as plastics can be used for construction. These materials also generally provide excellent corrosion resistance.

The low operating temperature of the invention dramatically reduces glycol evaporative loss. This effect reduces operating costs, improves the operating environment due to reduced odors, and reduces environmental liabilities resulting from glycol emissions.

The low operating temperature of the invention minimizes detrimental effects which can be caused by high temperatures. High temperature induced difficulties such as scaling and fouling of heat exchangers and other equipment can be minimized.

As a result of the reduced tendency toward fouling and scaling at lower operating temperatures, operating costs through the reduction of anti-scaling and dispersant chemical treatment costs as well as maintenance costs related to descaling and cleaning are reduced.

The low operating temperature of the invention minimizes chemical and mineral precipitation problems associated with fouling and scaling. As a result blowdown and makeup volumes can be reduced thereby minimizing operating costs and environmental liabilities.

Reduced tendencies toward scaling, fouling, chemical and mineral precipitation minimize requirements for treatment of the aqueous glycol solutions prior to dehydration. The result is reduced capital and operating expenses.

The lowered operating temperatures reduces or eliminates cooling requirements in temperature sensitive processes for which the dehydrated glycol solutions must not be hot.

While the foregoing discussions specify the many advantages inherent to the invention these do not constitute the full scope of the inventions advantages. There are many advantages beyond those defined herein. In a similar manner the embodiment described in the foregoing also is not the only embodiment possible. Other embodiments are possible.

An embodiment whereby a different gas, other than airstream 1 could be used with similar effects. Dehydration effects could also be varied through changes in the pressure of airstream 1 or other gas. The heat exchanger 2 supplies thermal energy to the airstream 1. The airstream 1 itself may supply part or all of the thermal energy into the contactor 5. If the pyschrometric conditions of the airstream into the contactor are such that evaporative cooling effects occur in the contactor, the thermal energy released through the cooling of the airstream can supplement or fulfill the thermal requirements of the invention. Under this scenario the over thermal energy requirements of the invention are reduced.

In the presented embodiment the contactor 5 has been inferred as being a structure which provides the environment necessary to contact the airstream 3 with the aqueous glycol solution 12. The physical nature of this structure may take a plurality of forms from a simple duct structure to more complex multi-chamber designs with control vanes and baffles for control flow patterns. Another possible embodiment would not require a contacting structure at all. In this embodiment an external lake, pond or pool as collection sump with a sparge system and or contacting media above this sump could be utilized. The airstream 3 could then be artificially induced or natural wind patterns utilized.

The air pollution control device 9 may or may not be necessary depending upon environmental constraints as well as contactor and sparger/contacting media parameters. If necessary the air pollution control device can be many different types of devices. Devices as simple as quiescent settling chambers or as sophisticated as electrostatic precipitators may be utilized. A possible configuration could include heat and/or mass transfer capabilities in the air pollution control device or in lieu of the air pollution control device to extract the latent heat of evaporation from the humidified airstream 11. The effects of this would be to recycle heat back into the process or to collect the resultant condensate. This condensate could be utilized as a fresh water source.

The dehydrated glycol solution 13 discharged from the contactor may also contain solids which form as a precipitate in the contactor 5. In this embodiment the aqueous glycol solution would contain dissolved and/or suspended solids which precipitate or agglomerate as a result of the aqueous concentrating effect of vaporization in the contactor 5. The generation of the solids and subsequent presence in the contactor discharge 13 could provide a beneficial embodiment in providing a low temperature method for crystallization or solids formation. These solids could have commercial value or their formation and extraction could improve the quality of the glycol solution in process. In this embodiment the contactor discharge 13 would include a method for removal of the solids from the contactor discharge 13.

The dehydrated glycol bleed 14, in a different embodiment, could be removed directly from the contactor 5 or at any point prior to the introduction of the aqueous glycol feed 22. The actual control of the dehydrated glycol bleed rate in the present embodiment is through mechanism 15.

Other embodiments are possible where the bleed control may be beyond the realm of the invention at the final use point of the dehydrated glycol 16. An example of such an embodiment would be one where the dehydrated glycol 16 would be fed into another cycle of the invention. In this embodiment the dehydrated glycol 16 from one cycle of the invention would be the actual feed stream 22 into a second or more cycles of the invention. Such a cascading embodiment would be useful for enhanced dehydration capabilities, reduced energy requirements, reduced emissions or other purposes. In such an embodiment the dehydrated glycol bleed 16 would be controlled by the inlet feed mechanism 23 of the following cycle rather than the dehydrated glycol bleed control mechanism 15.

In another embodiment of the invention the actual feedstream 22 and 24 as well as the fluids 12, 13, 14, 16, 17, and 18 could be aqueous solutions of constituents other than or in addition to glycols. Given the specifics that said other constituents have vapor pressures significantly less than water vapor at process temperatures consistent with the available thermal sources, dehydration of these solutions could also be achieved with the invention.

In other embodiments of the invention the aqueous glycol inlet feed 22 may be introduced into the process at any point prior to the contactor. The defining parameters for introduction points relate to the aqueous glycol 22 feed pressure, the presence and performance parameters of the heat exchanger 20, the presence and performance of the circulating pump 19 or physical constraints of the installation site.

After the glycol solution 12 contacts the airstream 3 all or a percentage of it is recirculated for recontact. The driving force for this recirculation is through the pumping mechanism 19. In other embodiments this pumping mechanism can be located in other locations in the process depending on aqueous glycol feed 22 pressure and location, heat exchanger 20 performance parameters and location, required dehydrated glycol bleed 14 pressure requirements and physical constraints of the installation site.

Heat exchanger 20 provides thermal energy to the glycol solution 18 in the invention process. In those embodiments in which heat exchanger 2 is being utilized the presence of heat exchanger 20 is optional. In other embodiments in which heat exchanger 20 is utilized, the heat exchanger may be located in a multitude of locations in the glycol solution stream 12, 13, 17, 18 as well as on the aqueous glycol feed stream 22. An embodiment which utilizes a multitude of heat exchangers is also possible where the heat exchangers would be placed at various locations on the glycol solution stream 12, 13, 17, 18 and/or 22.

The following are claimed:

1. A low temperature dehydration process for the regeneration of an aqueous glycol solution and removal of water and other contaminates from the aqueous glycol solution inside a contacting chamber, the steps comprising:

introducing an airstream into the contacting chamber;

introducing the aqueous glycol solution into the contacting chamber;

introducing and contacting the airstream with the aqueous glycol solution inside the contacting chamber;

removing a humidified airstream from the contacting chamber; and removing a dehydrated glycol solution from the contacting chamber for further use.

2. The process as described in claim 1 further including a step of warming the aqueous glycol solution prior to introducing the aqueous glycol solution inside the contacting chamber.

3. The process as described in claim 1 further including a step of removing any precipitated solids from the dehydrated glycol when the dehydrated glycol is removed from the contacting chamber.

4. The process as described in claim 1 further including a step of removing any precipitated solids in the contacting chamber after the airstream has contacted the aqueous glycol solution.

5. The process as described in claim 1 further including a step of reintroducing the dehydrated glycol solution back into the contacting chamber for further dehydration.

6. The process as described in claim 1 further including a step of blending a portion of the dehydrated glycol solution removed from the contacting chamber with aqueous glycol solution to be introduced into the contacting chamber.

7. The process as described in claim 1 wherein a differential between a dry bulb temperature and a wet bulb temperature of the airstream is sufficient to provide an environment in which thermal energy released from the evaporative cooling effects of the airstream contributes thermal energy to the dehydration process.

8. A low temperature dehydration process for the regeneration of an aqueous glycol solution and removal of water and other contaminates from the aqueous glycol solution inside a contacting chamber, the steps comprising:

introducing an airstream into the contacting chamber;

introducing a heated aqueous glycol solution into the contacting chamber;

introducing and contacting the heated aqueous glycol solution with the airstream inside the contacting chamber;

removing a humidified airstream from the contacting chamber; and removing a dehydrated glycol solution from the contacting chamber for further use.

9. The process as described in claim 8 further including a step of removing entrained aqueous glycol from the airstream after the airstream contacts the aqueous glycol solution using an air pollution control device.

10. The process as described in claim 8 further including a step of removing any precipitated solids from the dehydrated glycol when the dehydrated glycol is removed from the contacting chamber.

11. The process as described in claim 8 further including a step of removing any precipitated solids in the contacting chamber after the airstream has contacted the aqueous glycol solution.

12. The process as described in claim 8 further including a step of reintroducing the dehydrated glycol solution back into the contacting chamber for further dehydration.

13. The process as described in claim 8 further including a step of blending a portion of the dehydrated glycol solution removed from the contacting chamber with the heated aqueous glycol solution to be introduced into the contacting chamber.

14. A low temperature dehydration process for the regeneration of an aqueous glycol solution and removal of water and other contaminates from the aqueous glycol solution inside a contacting chamber, the steps comprising:

treating an airstream to increase a wet bulb to dry bulb temperature differential;

introducing the treated airstream into the contacting chamber;

introducing an aqueous glycol solution into the contacting chamber;

introducing and contacting the treated airstream with the aqueous glycol solution inside the contacting chamber;

removing a humidified airstream from the contacting chamber; and removing a dehydrated glycol solution from the contacting chamber for further use.

15. The process as described in claim 14 wherein the wet bulb to dry bulb temperature differential of the airstream is increased by transferring heat from an external source to the airstream.

16. The process as described in claim 14 wherein the wet bulb to dry bulb temperature differential of the airstream is increased by transferring heat from an external waste heat source to the airstream.

17. The process as described in claim 14 wherein the wet bulb and dry bulb temperature differential of the airstream is increased by dehumidification of the incoming airstream.

18. The process as described in claim 14 further including a step of heating the aqueous glycol solution with an external waste heat source prior to introducing the aqueous glycol solution into the contacting chamber.

19. The process as described in claim 14 further including a step of removing any precipitated solids from the dehydrated glycol when the dehydrated glycol is removed from the contacting chamber.

20. The process as described in claim 14 further including a step of removing any precipitated solids in the contacting chamber after the treated airstream has contacted the aqueous glycol solution.

21. The process as described in claim 14 further including a step of blending a portion of the dehydrated glycol solution removed from the contacting chamber with heated aqueous glycol solution to be introduced into the contacting chamber.

* * * * *